US009383265B2

(12) United States Patent
Dib et al.

(10) Patent No.: US 9,383,265 B2
(45) Date of Patent: Jul. 5, 2016

(54) METHOD AND SYSTEM OF INTERNAL TEMPERATURES DETERMINATION IN A SYNCHRONOUS ELECTRICAL MACHINE USING STATE OBSERVERS (71) Applicant: IFP Energies nouvelles, Rueil-Malmaison Cedex (FR)

(72) Inventors: Wissam Dib, Suresnes (FR); Nicolas Henwood, Paris (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 122 days.

(21) Appl. No.: 14/283,360

(22) Filed: May 21, 2014

(65) Prior Publication Data

US 2014/0346991 A1   Nov. 27, 2014

(30) Foreign Application Priority Data

May 21, 2013   (FR) ...................... 13 54519

(51) Int. Cl.
  *H02P 21/13*   (2006.01)
  *G01K 7/16*    (2006.01)
  *H02P 29/00*   (2016.01)
  *H02P 21/14*   (2016.01)
  *H02P 23/12*   (2006.01)

(52) U.S. Cl.
  CPC ................ *G01K 7/16* (2013.01); *H02P 21/141* (2013.01); *H02P 23/12* (2013.01); *H02P 29/0066* (2013.01)

(58) Field of Classification Search
  CPC ............ H02P 6/00; H02P 6/16; H02P 6/181; H02P 21/00; H02P 21/14; H02P 21/141; H02P 23/12; H02P 29/0044; H02P 29/0066; H02P 29/02; H02P 25/08; H02K 29/06; B60L 2240/425; B60L 11/14; B60L 15/025; B60L 2200/26; B60L 2220/14; B60L 2220/18; G01K 7/16; Y02T 10/643; Y02T 10/70; Y02T 10/7077; B62D 5/0463
  USPC ............... 318/400.32, 471, 472, 700, 400.01, 318/804, 803, 805, 823, 400.4, 400.15, 721, 318/801
  See application file for complete search history.

(56) References Cited

U.S. PATENT DOCUMENTS

| 6,281,659 | B1 * | 8/2001  | Giuseppe ...................... 318/727 |
| 6,731,083 | B2 * | 5/2004  | Marcinkiewicz .... B23K 20/121 318/114 |
| 8,115,441 | B2 * | 2/2012  | Romenesko ................... 318/727 |
| 8,242,722 | B2 * | 8/2012  | Matsui .................... B60L 11/14 318/400.04 |
| 8,421,255 | B2 * | 4/2013  | Jansen ..................... G01K 7/42 290/44 |
| 8,610,389 | B2 * | 12/2013 | Lee ....................... B62D 5/0463 318/257 |
| 8,742,704 | B2 * | 6/2014  | Nakatsugawa ...... H02P 21/0042 318/400.02 |
| 8,791,716 | B2 * | 7/2014  | Tanimoto .............. B60L 3/0061 318/700 |
| 8,912,739 | B2 * | 12/2014 | Kobayashi ............ H02P 21/141 318/400.02 |

(Continued)

FOREIGN PATENT DOCUMENTS

DE   10 2007 062 712 A1   7/2009
WO   WO 2009/009232 A3    1/2009

*Primary Examiner* — Rita Leykin
(74) *Attorney, Agent, or Firm* — Fitch, Even, Tabin & Flannery LLP (57) ABSTRACT The invention relates to a method of determining internal temperatures (2) (coil and magnet temperatures) in a synchronous electrical machine (4) using state observers for the resistance of the coils and the magnetic flux of the magnet. The invention also relates to a diagnostic method, a control method and system (3) for controlling a synchronous electrical machine from the internal temperatures thus determined.

28 Claims, 2 Drawing Sheets

(56) References Cited

U.S. PATENT DOCUMENTS

| | | | |
|---|---|---|---|
| 8,981,694 B2 * | 3/2015 | Yoon | H02P 6/165 318/400.32 |
| 9,160,272 B2 * | 10/2015 | Tachibana | H02P 6/08 |
| 2010/0276929 A1 | 11/2010 | Jansen | |
| 2011/0144843 A1 | 6/2011 | Wu et al. | |
| 2013/0028292 A1 | 1/2013 | Senoo | |

* cited by examiner

METHOD AND SYSTEM OF INTERNAL TEMPERATURES DETERMINATION IN A SYNCHRONOUS ELECTRICAL MACHINE USING STATE OBSERVERS

CROSS REFERENCE TO RELATED APPLICATION

Reference is made to French patent application Ser. No. 13/54.519, filed on May 21, 2013, which application is incorporated herein by reference in its entirety.

BACKGROUND OF THE INVENTION

Field of the Invention

The present invention relates to the control and diagnostics of synchronous electrical machines, notably for motor vehicles.

A synchronous machine is comprised of a rotating part, the rotor, and of a stationary part, the stator. The rotor can be made up of permanent magnets or of a DC-powered coil and a magnetic circuit, referred to as electromagnet. The stator comprises three phases, on each one of which at least one coil (also referred to as winding) is connected, and these three coils are supplied with power and voltage. An external force is used to rotate the rotor which is a magnetic field induced by an alternating electrical current in coils (windings) of the stator. The speed of this rotating field is referred to as "synchronous speed".

To control and diagnose such electrical machines, it can be important to know the internal temperatures of the electrical machines. Indeed, the temperature information can be used by conventional vector control of the torque of the electrical machine. Thus, the behavior variations of the electrical machine upon temperature rise can be taken into account, such as, for example, the magnet flux intensity and the coil resistance are not constant and vary with the temperature. Vector control is referenced because, for the machine to produce the torque required by the application, the electrical currents circulating therein must be kept in phase and in synchronism with the position of the rotor. The control of the electrical machine therefore applies voltages to the terminals of the motor provided by a torque control algorithm.

The internal temperatures of the electrical machine correspond to the temperature of the coils and the magnet (or of the electromagnet) integrated in the rotor. Furthermore, the temperature of the frame of the electrical machine can also be used for control and diagnostic purposes. What is referred to as the frame is comprised of the ferromagnetic materials of the stator acting as a support including the coils.

Temperature detectors provided within the electrical machine can be used to determine these temperatures. However, such detectors cannot be arranged on the rotating rotor so the temperature of the magnet on the rotor can therefore not be sensed. Furthermore, the detectors only allow measurement of the temperature on the surface of the coils or of the frame, but not within the materials. Moreover, such equipment involves other drawbacks such as inaccurate measurements, the presence of measurement noise, risk of detector failure, high cost, etc.

Moreover, algorithms have been developed to determine the internal temperatures from measurements performed on the electrical machine. The algorithms described in the prior art reconstruct either the temperature of the magnets or the temperature of the coils separately, by estimating them from the electrical measurements of the physical quantities that vary with these temperatures which may be classified into two major categories which are:

Categories based on the providing of signals, which require applying selected voltages at the motor terminals so that the physical parameters of the motor related to the internal temperature thereof can be extracted, or Categories requiring no particular signal at the motor input, which are based only on a mathematical description of the behavior thereof (real-time estimator or observer).

Furthermore, these solutions are used only for monitoring the electric machine and not for controlling it.

No material or algorithmic solution therefore allows determination simultaneously and precisely the temperatures of the coils and of the magnet.

SUMMARY OF THE INVENTION

In order to overcome these problems, the invention relates to a method of determining the internal temperatures (coil and magnet temperatures) using state observers for the resistance of the coils and the magnetic flux of the magnet. The temperature of all the components of the electrical machine can thus be precisely determined. The invention also relates to a diagnostic method, a control method and system for controlling an electrical machine from the internal temperatures thus determined.

The invention relates to a method of determining internal temperatures in a synchronous electrical machine, comprising a stator having three phases with each phase being connected to at least one coil and a rotor comprising at least one magnet. The electromagnetic field of the coils causes rotation of the rotor, wherein speed $\Omega_m$ of the rotor, as well as voltages and currents $u_m$ and $i_m$ of the phases, are measured. The following stages are carried out for this method:

a) estimating a resistance $\hat{R}$ for the coils using a state observer of the resistance $\hat{R}$ of the coils from the measurements, with the resistance depending on the temperature $T_{cu}$ of the coils;

b) estimating an intensity of the magnetic flux $\hat{\phi}$ of the magnet with a state observer for the intensity $\hat{\phi}$ of the magnetic flux of the magnet from the measurements with the magnetic flux intensity depending on the temperature $T_{ai}$ of the magnet;

c) determining a temperature $T_{cu}$ for the coils by estimation of resistance $\hat{R}$ of the coils; and d) determining a temperature $T_{ai}$ for the magnet from the estimation of the intensity of magnetic flux $\hat{\phi}$ of the magnet.

According to the invention, the resistance $\hat{R}$ of the coils is estimated by carrying out the following stages:

i) determining voltages $u_{d,q}$ and currents $i_{d,q}$ in Park's reference frame through transformation of the measured voltages $u_m$ and currents $i_m$, ii) estimating current $\hat{i}_d$ and current $\hat{i}_q$ with equations of the type as follows:

$$L_d \hat{i}_d = -\hat{R}(T_{cu})\hat{i}_d + p\Omega_m L_q \hat{i}_q + u_d - k_d(i_d - \hat{i}_d)$$
$$L_q \hat{i}_q = -\hat{R}(T_{cu})\hat{i}_q - p\Omega_m(L_d \hat{i}_d + \hat{\phi}(T_{ai})) + u_q - k_p(i_d - \hat{i}_d); \text{ and}$$

iii) estimating the resistance $\hat{R}$ of the coils by use of the measurements and of the currents $\hat{i}_d$ and $\hat{i}_q$ and which are estimated by a state observer of the form as follows:

$$\dot{\hat{R}}(T_{cu}) = k_r \left( i_d \frac{(i_d - \hat{i}_d)}{L_d} + i_q \frac{(i_q - \hat{i}_q)}{L_q} \right)$$

with: $L_d$ being the direct inductance of the electrical machine;

$L_q$ being the quadrature inductance of the electrical machine;

$k_d$, $k_r$, $k_p$, and $k_\phi$ being the calibration variables; and p being the number of pole pairs of the electrical machine.

According to the invention, the magnetic flux intensity $\hat{\phi}$ of the magnet is estimated by carrying out the following stages:

i) determining voltages $u_{d,q}$ and currents $i_{d,q}$ in Park's reference frame through transformation of the measured voltages $u_m$ and currents $i_m$, ii) estimating current $\hat{i}_d$ and current $\hat{i}_q$ with equations of the type as follows:

$L_d \dot{\hat{i}}_d = -\hat{R}(T_{cu})\hat{i}_d + p\Omega_m L_q \hat{i}_q + u_d - k_d(i_d - \hat{i}_d)$ $L_q \dot{\hat{i}}_q = -\hat{R}(T_{cu})\hat{i}_q - p\Omega_m (L_d \hat{i}_d + \hat{\phi}(T_{ai})) + u_q - k_p(i_q - \hat{i}_q)$; and iii) estimating the magnetic flux intensity $\hat{\phi}$ of the magnet by use of the measurements and of the currents $\hat{i}_d$ and $\hat{i}_q$ estimated by a state observer of the form as follows:

$$\dot{\hat{\phi}}(T_{ai}) = k_\phi \left( p\Omega_m \frac{(i_q - \hat{i}_q)}{L_q} \right)$$

with: $L_d$ being the direct inductance of the electrical machine;

$L_q$ being the quadrature inductance of the electrical machine;

$k_d$, $k_r$, $k_p$, and $k_\phi$ being the calibration variables; and p being the number of pole pairs of the electrical machine.

Advantageously, the temperature $T_{cu}$ of the coils is determined by use of an equation of the form as follows: $\hat{R} = R_0(1 + \alpha(T_{cu} - T_{ref}))$ with $R_0$ being the reference resistance of the coils for the reference temperature $T_{ref}$ and $\alpha$ being a constant temperature resistance parameter of the coils.

Advantageously, the temperature $T_{ai}$ of the magnet is determined from an equation of the form as follows: $\hat{\phi} = \phi_0(1 + \beta(T_{ai} - T_{ref}))$ with $\phi_0$ being the reference magnetic flux intensity of the magnet for reference temperature $T_{ref}$ and $\beta$ being a constant temperature resistance parameter of the magnet.

Furthermore, the method can comprise a stage of preprocessing electrical quantities upstream from the stages of estimating the resistance of the coils and the magnetic flux intensity of the magnet.

Preferably, the preprocessing of an electrical quantity y is carried out by decomposition of a measured electrical signal $y_m$ into a sum of cosinus and sinus functions depending on the measured position $\theta_m$ of the rotor wherein $$y_m = \sum_{i=1}^{N} (a_i \cos(i\theta_m) + b_i \sin(i\theta_m)),$$

coefficients $a_i$ and $b_i$ are determined by identification, then by conservation of the leading term: $y_f = a_1 \cos(\theta_m) + b_1 \sin(\theta_m)$.

According to an embodiment of the invention, a temperature $T_{fer}$ is determined for the frame of the electrical machine by use of the temperatures $T_{cu}$ of the coils and $T_{ai}$ of the magnet and of energy losses of the electrical machine.

Preferably, the temperature $T_{fer}$ of the frame is determined from a formula of the type as follows: $\dot{\hat{T}} = AT + KC(\hat{T} - T) + BP$ with $T = (T_{fer}, T_{cu}, T_{ai})$, $P = (P_{fer}, P_{joules}, P_m)$ with $P_{fer}$ corresponding to the iron losses of the electrical machine, $P_{joules}$ being the joule losses of the electrical machine, $P_m$ to the mechanical losses of the electrical machine, K being a gain, A being a constant matrix of the thermal model, $$B = \begin{bmatrix} 1 \\ 1 \\ 1 \end{bmatrix}$$

and $$C = [0 \quad 1 \quad 1].$$

The invention also relates to a diagnostic method for a synchronous electrical machine, wherein the following stages are carried out:

determining the internal temperatures of the electrical machine according to the method described above; and diagnosing overheating of the synchronous machine according to the determined temperatures.

Furthermore, the invention relates to a method of controlling a synchronous electrical machine, wherein the following stages are carried out:

determining the internal temperatures of the electrical machine according to the method described above; and controlling the torque of the synchronous machine according to the determined temperatures.

The invention also relates to a system of controlling a synchronous electrical machine suited to apply the control method as described above.

The invention also relates to a motor vehicle comprising at least one synchronous electrical machine with the vehicle furthermore comprising a control system as described above.

BRIEF DESCRIPTION OF THE DRAWINGS

Other features and advantages of the method according to the invention will be clear from reading the description hereafter of embodiments given by way of non limitative example, with reference to the accompanying figures wherein.

DETAILED DESCRIPTION OF THE INVENTION

As stated, the method according to the invention is suited for a synchronous electrical machine. Such a machine is comprised of a rotating part which is the rotor and of a stationary part which is the stator. The rotating part comprises at least one magnet (or electromagnet). The stator comprises at least three coils distributed among three phases wherein the coils (generally made of copper) are supplied alternately so as to generate a magnetic field suited to rotate the rotor. The coils are supported by a frame, generally made of iron, also referred to as casing.

Figure 1:
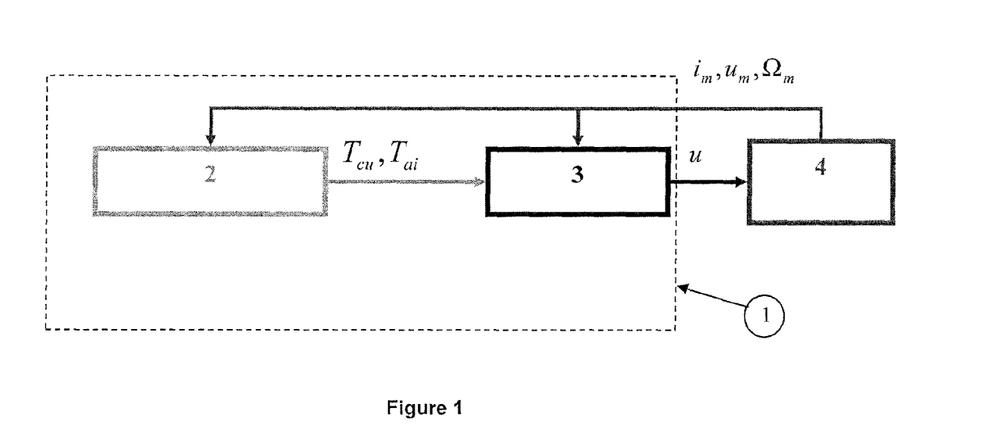
FIG. 1 illustrates the control of a synchronous electrical machine according to the invention.

FIG. 1 illustrates the control of a synchronous electrical machine conventionally made up of three phases. This machine can be of permanent magnet, controlled excitation or double excitation type. Electrical machine (4) is provided with at least one means for measuring the position and/or the speed of the rotor, and a means for measuring the phase voltages and currents wherein these devices are not shown. A control (1) of the electrical machine has means (2) which determines the internal temperatures (coil, magnet and optionally frame temperatures) of electrical machine (4) and means (3) for controlling the torque of electrical machine (4). Internal temperature determination means (2) determines the temperatures from the measurements of speed $\Omega_m$ of the rotor and from the measurements of voltages $u_m$ and currents $i_m$. These are the currents and the voltages of each one of the three phases of electrical machine (4). Torque control means (3) applies voltages to the motor terminals according to the internal temperatures, speed $\Omega_{rot}$ and voltages $u_m$ and currents $i_m$ in order to provide a torque setpoint for electrical machine (4).

Notations

The following notations are used in the description:
u are voltages at the terminals of the phases of the electrical machine.
i are currents circulating in the phases of the electrical machine.
$\theta$ is the rotor position, corresponding to the angle of rotation of the rotor of the electrical machine in relation to the stator.
$\Omega$ is the rotor speed, corresponding to the rotating speed of the rotor of the electrical machine in relation to the stator.
$T_{cu}$ is the temperature of the coils of the electrical machine.
$T_{ai}$ is the temperature of the magnet of the rotor of the electrical machine
$T_{fer}$ is the temperature of the frame of the electrical machine.
T is the three-dimensional temperature vector, such that $T=(T_{fer}, T_{cu}, T_{ai})$.
$T_{ref}$ is the reference temperature which generally is 20° C.
$\phi$ is the intensity of the magnetic flux of the rotor magnet which is variable according to the temperature of the coils $T_{cu}$.
$\phi_0$ is the intensity of the reference flux at reference temperature $T_{ref}$, according to manufacturer's data.
R is the resistance of the coils of the electrical machine which is variable according to the temperature of the magnet $T_{ai}$.
$R_0$ is the resistance of the reference coils at the reference temperature $T_{ref}$, according to manufacturer's data.
$L_d$ is the direct inductance of the electrical machine, it is a known parameter of the electrical machine (manufacturer's data or experimentally obtained).
$L_q$ is the quadrature inductance of the electrical machine which is a known parameter of the electrical machine (manufacturer's data or experimentally obtained).
$P_{joules}$ is the energy losses in the electrical machine due to Joule effect according to the manufacturer's data that can be given in form of a map as a function of the torque and the speed of the electrical machine.
$P_{fer}$ is the energy loss in the frame of the electrical machine according to manufacturer's data that can be given in form of a map as a function of the torque and the speed of the electrical machine.
$P_m$ is the mechanical energy losses in the electrical machine according to manufacturer's data that can be given in form of a map as a function of the torque and the speed of the electrical machine.
P is the three-dimensional loss vector, such that $P=(P_{fer}, P_{joules}, P_m)$.
p is the number of pole pairs of the electrical machine.
$\alpha$ is the constant temperature resistance parameter of the coils which depends on the resistivity of the material of the coils.
$\beta$ is the constant temperature resistance parameter of the magnet which depends on the magnet.
$k_d, k_q, k_r, k_\phi, k_d, k_q, k_r,$ and $k_\phi$ are calibration variables allowing the convergence of the state observers to be managed.
K is the calibration gain for the thermal model.
A is the constant matrix of the thermal model.
B is constant column vector wherein $$B = \begin{bmatrix} 1 \\ 1 \\ 1 \end{bmatrix}.$$

C is constant row vector wherein C=[0 1 1].

These notations, indexed by $_m$, represent the measured values. The estimated values are indicated by a circumflex. Time derivatives are indicated by a dot. The notations indexed by $_d$ or $_q$ mean that the quantities are expressed in Park's reference frame.

Figure 2:
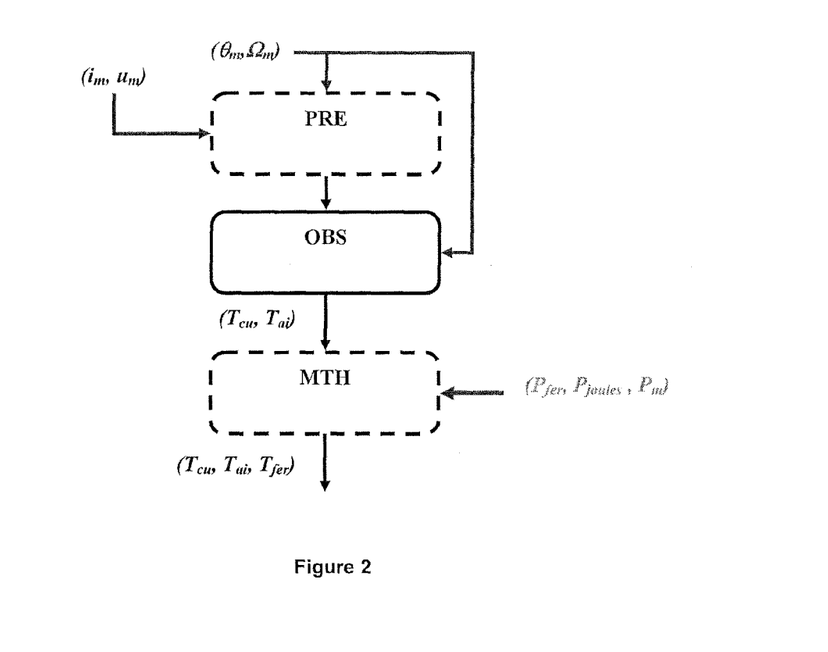
FIG. 2 is a flowchart of the method according to the invention.

The invention allows determination of the internal temperatures of an electrical machine. FIG. 2 describes the various stages of the method according to the invention:

1) Preprocessing the electrical quantities (PRE)
2) Estimating the coil and magnet temperatures (OBS)
3) Estimating the frame temperature (MTH).

The stages of preprocessing the electrical quantities (PRE) and of estimating the frame temperature (MTH) are optional stages.

Prior to these stages, currents i and voltages u in the phases of the electrical machine are measured as well as rotor position $\theta$ and rotor speed $\Omega$.

According to the invention, rotor position $\theta$ and rotor speed $\Omega$ are determined using measured values. To achieve such measurements, any detector type can be used, notably a low-cost position detector allowing the setup costs to be limited. It can notably be a Hall effect sensor or an inductive detector. A single position detector can be used as the rotating speed can be deduced from the position. Alternatively, estimation algorithms can be used to determine these quantities. An example of such an algorithm is notably described in French patent application 11/03,994.

The synchronous electrical machine is torque controlled through control of the voltages and currents of the power supplied to the phases of the synchronous electrical machine. For optimum control of this motor, it is necessary to measure voltages $u_m$ at the phase terminals and currents $i_m$ circulating therein, by use of voltage and current detectors.

1) Preprocessing the Electrical Quantities (PRE)

Measurements of electrical quantities generally comprise measurement noise, which generates inaccuracies for estimating the various internal temperatures. To overcome this problem, a stage of preprocessing (PRE) of the electrical quantities (illustrated in dotted line in FIG. 2) can be carried out upstream from the stage of estimating the temperatures (OBS). This preprocessing allows filtering the measured quantities and therefore to improve the internal temperatures estimation quality.

According to an embodiment of the invention, preprocessing of an electrical quantity y (voltage or current) is achieved by decomposition of the measured electrical signal $y_m$ into a sum of cosinus and sinus functions depending on the measured position:

$$y_m = \sum_{i=1}^{N}(a_i\cos(i\theta_m) + b_i\sin(i\theta_m))$$

and coefficients $a_i$ and $b_i$ are determined by identification. It is noted in practice that N=3 or N=4 allows correct processing of the measured data. Only the leading term is then kept (N=1): $y_f = a_1\cos(\theta_m) + b_1\sin(\theta_m)$. The preprocessed quantity is then used for the state observers defined hereafter.

2) Estimating the Coil and Magnet Temperatures (OBS)

Estimation (OBS) of the temperature of the windings and of the magnets is achieved from the (possibly preprocessed) measurements using two state observers which are resistance R of the coils and magnetic flux φ of the magnet.

Figure 3:
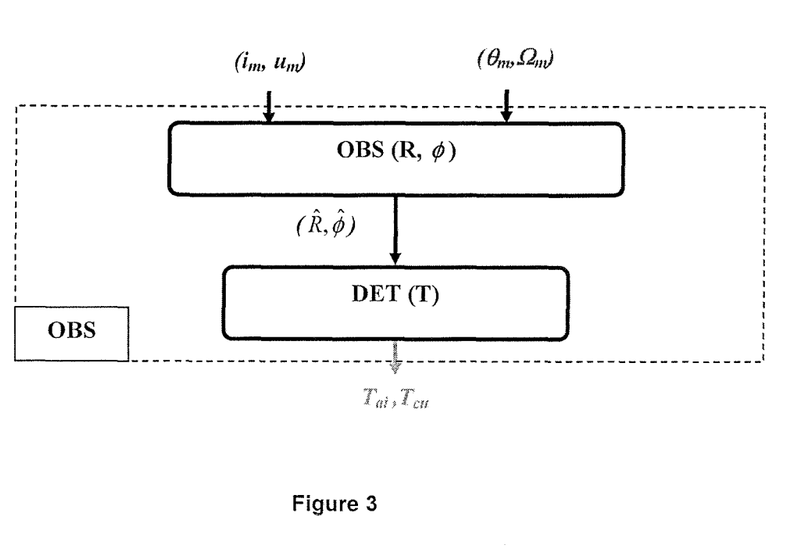
FIG. 3 illustrates an embodiment of the stage of determining the temperatures using state observers.

According to an embodiment of the invention, this stage can comprise two indissociable parts, illustrated in FIG. 3, as follows:

- An estimation of the magnetic flux intensity of the magnets of the machine and of the resistance of the coils (OBS (R, φ)); and
- A reconstruction of the temperatures (DET(T)) from the estimated magnetic flux and resistance.

For this stage, a Park reference frame is desired and therefore conversion of the three-phase electrical quantities to two-dimensional quantities denoted by d and q, which are direct and in quadrature is respectively performed. Indeed, the Park transform is a mathematical tool used in electrical engineering in order to perform a reference frame change in a two-phase or three-phase axis system. It is generally used to change from a "stationary" reference frame related to the stator of an electrical machine to a rotating reference frame related to the rotor thereof or to the magnetic field.

To construct the state observers according to the invention, a basis is a state space representation of the synchronous motors of the type as follows:

$L_d \dot{i}_d = -R(T_{cu})i_d + p\Omega_m L_q i_q + u_d$
$L_q \dot{i}_q = -R(T_{cu})i_q - p\Omega_m(L_d i_d + \phi(T_{ai})) + u_q$.

Flux φ and resistance R are not measurable and they are variable according to the operating temperature of the electrical machine.

It is then possible to design an observer providing real-time calculation of an estimation $(\hat{i}_d, \hat{i}_q)$ of currents $(i_d, i_q)$ of the type as follows:

$L_d \dot{\hat{i}}_d = -\hat{R}(T_{cu})\hat{i}_d + p\Omega_m L_q \hat{i}_q + u_d - k_d(i_d - \hat{i}_d)$
$L_q \dot{\hat{i}}_q = -\hat{R}(T_{cu})\hat{i}_q - p\Omega_m(L_d \hat{i}_d + \hat{\phi}(T_{ai})) + u_q - k_p(i_d - \hat{i}_d)$ where $\hat{R}$ and $\hat{\phi}$ are estimations of the resistance of the windings and of the flux of the magnet. These quantities can be calculated in real time by state observers of the type as follows:

$$\dot{\hat{R}}(T_{cu}) = k_r\left(i_d\frac{(i_d - \hat{i}_d)}{L_d} + i_q\frac{(i_q - \hat{i}_q)}{L_q}\right)$$

$$\dot{\hat{\phi}}(T_{ai}) = k_\phi\left(p\Omega_m\frac{(i_q - \hat{i}_q)}{L_q}\right).$$

For these formulas, $k_d$, $k_r$, $k_p$ and $k_\phi$ are calibration variables allowing the rate of convergence of the state observers to be managed.

From the above equations, it is possible to estimate resistance $\hat{R}$ and magnetic flux $\hat{\phi}$ converging towards the true values of $R(T_{cu})$ and $\phi(T_{ai})$. It is then possible to reconstruct the various temperatures by inverting the following equations from the values estimated by the state observers as follows:

$\hat{R} = R_0(1 + \alpha(T_{cu} - T_{ref}))$
$\hat{\phi} = \phi_0(1 + \beta(T_{ai} - T_{ref}))$.

In these equations, $\phi_0$ corresponds to the intensity of the reference flux at reference temperature $T_{ref}$ (generally selected equal to 20° C.), which is from manufacturer's data, $R_0$ corresponds to the resistance of the reference coils at reference temperature $T_{ref}$ which is also from manufacturer's data, α and β are respectively the temperature resistance coefficients of the copper (coils) and of the magnet. These coefficients are constant and depend upon the resistivity of the materials.

Thus, by use of two state observers (for the resistance of the coils and the magnetic flux of the magnet), two internal temperatures of the electrical machine can be determined which are the temperature $T_{cu}$ the coils and the temperature $T_{ai}$ of the magnet.

3) Estimating the Temperature of the Frame (MTH)

According to the invention, it is also possible to estimate the temperature of the frame of the electrical machine. This estimation can be performed from the coil and magnet temperatures $T_{cu}$ and $T_{ai}$ by accounting for the various energy losses in the electrical machine.

According to an embodiment of the invention, the temperature of the frame can be determined by use of a second observer based on a thermal model (MTH) of the electrical machine and on the temperature observations obtained in the previous stage.

The thermal representation of synchronous machines can be written as follows:

$\dot{T} = AT + BP$
$y = CT = (T_{cu}, T_{ai})$ with A being a constant matrix of the thermal model, $$B = \begin{bmatrix} 1 \\ 1 \\ 1 \end{bmatrix}$$

and $$C = [0 \ 1 \ 1].$$

Matrix A can be obtained by identification from a complex thermal model. Since it is complex, it cannot be used on-line in the control system. A reduced model (T=AT+BP) workable on-line from a complex model is constructed by identifying A. This reduced model (T=AT+BP) is then used for estimating the temperature of the iron.

An observer that calculates in real time an estimation of temperature $T_{fer}$ of the frame (iron existing in the stator, serving as a support and including the winding) is designed with an equation of the type as follows:

$\dot{\hat{T}} = A\hat{T} + KC(\hat{T} - T) + BP$.

Gain K allows management of the rate of convergence of the estimated temperature $\hat{T}$ at the real value T.

All the stages of the method can be executed by computer tools running on a processor executing a stored program which functions notably as a controller of the electrical machine. The various internal temperatures of the electrical machine can thus be determined in real time.

Furthermore, the invention relates to a diagnostic method for a synchronous electrical machine, wherein the following stages are carried out:

determining the internal temperatures of the coil, magnet and optionally the frame of the electrical machine by using the method described above, and diagnosing overheating of the electrical machine or of one of the components thereof which are the coils, magnet and frame according to the determined temperatures, such as, for example, when the determined temperatures are above thresholds defined by the manufacturer and/or the user.

The invention also relates to a method of controlling a synchronous electrical machine, wherein the following stages are carried out:

determining the internal temperatures of the coil, magnet and optionally the frame of the electrical machine by use of the method described above, and controlling the torque of the synchronous machine according to the determined temperatures. This stage can be carried out using any conventional form of vector control of the torque of the electrical machine that accounts for, in addition to the temperatures, the measured voltages and currents, as well as the rotor position and speed measurements. Taking into account of the temperature for control of the electrical machine allows precise determination of the behavior of the electrical machine, which enables a control suited to an operation to be achieved.

Furthermore, the invention relates to a system of controlling a synchronous electrical machine for applying the control method as described above. Such a system (1) for controlling an electrical machine (4) is illustrated in FIG. 1. Control means (1) of the electrical machine is comprised of means (2) of determining the internal temperatures of the coil, magnet and optionally frame temperatures of electrical machine (4) and means (3) for controlling the torque of electrical machine (4). The means (2) for determining the internal temperatures determine the temperatures from the measurements of speed $\Omega_m$ of the rotor and from the measurements of voltages and currents $u_m$ and $i_m$. These are the voltages and currents of each one of the three phases of electrical machine (4). Torque control means (3) apply voltages at the motor terminals according to the internal temperatures, the speed $\Omega_{rot}$ and the voltages $u_m$ and the currents $i_m$ in order to provide a torque setpoint for electrical machine (4).

This control system can be used for a synchronous electrical machine onboard a vehicle, notably an electrical or hybrid motor vehicle. However, the control system described is not limited to this application and it is suited for all synchronous electrical machine applications.

The invention claimed is:

1. A method of determining internal temperatures in a synchronous electrical machine comprising a stator including three phases to which in each phase at least one coil is connected, and a rotor comprising at least one magnet wherein an electromagnetic field is provided from the at least one coil which causes rotation of the rotor, with speed of the rotor and voltages and currents and of the phases being measured, comprising:

a) estimating a resistance of the at least one coil using a state observer of the resistance of the at least one coil provided from the measurements and the resistance depending on a temperature of the at least one coil;

b) estimating an intensity of magnetic flux provided by the at least one magnet by using a state observer of intensity of magnetic flux of the at least one magnet provided from the measurements and the magnetic flux intensity depending on temperature of the at least one magnet;

c) determining a temperature of the at least one coil using the estimation of resistance of the at least one coil; and d) determining a temperature of the at least one magnet by using the estimation of intensity of magnetic flux of the at least one magnet.

2. A method as claimed in claim 1, wherein the resistance $\hat{R}$ of the coils is estimated by:

i) determining voltages $u_{d,q}$ and currents $i_{d,q}$ in Park's reference frame through transformation of the measured voltages $u_m$ and currents $i_m$, ii) estimating current $\hat{i}_d$ and current $\hat{i}_q$ with equations of the type as follows:
$L_d \dot{\hat{i}}_d = -\hat{R}(T_{cu})\hat{i}_d + p\Omega_m L_q \hat{i}_q + u_d - k_d(i_d - \hat{i}_d)$
$L_q \dot{\hat{i}}_q = -\hat{R}(T_{cu})\hat{i}_q - p\Omega_m(L_d \hat{i}_d + \phi(T_{ai})) + u_q - k_p(i_q - \hat{i}_q)$; and iii) estimating the resistance $\hat{R}$ of the coils by using the measurements and of the currents $\hat{i}_d$ and $\hat{i}_q$ estimated by a state observer as follows:

$$\dot{\hat{R}}(T_{cu}) = k_r\left(i_d \frac{(i_d - \hat{i}_d)}{L_d} + i_q \frac{(i_q - \hat{i}_q)}{L_q}\right)$$

with: $L_d$ being the direct inductance of the electrical machine;

$L_q$ being the quadrature inductance of the electrical machine;

$k_d$, $k_r$, $k_p$, and $k_\phi$ being the calibration variables ; and p being the number of pole pairs of the electrical machine.

3. A method as claimed in claim 2, wherein the magnetic flux intensity $\hat{\phi}$ of the at least one magnet is estimated by:

i) determining voltages $u_{d,q}$ and currents $i_{d,q}$ in Park's reference frame through transformation of the measured voltages $u_m$ and currents $i_m$, ii) estimating current $\hat{i}_d$ and current $\hat{i}_q$ with equations of the type as follows:
$L_d \dot{\hat{i}}_d = -\hat{R}(T_{cu})\hat{i}_d + p\Omega_m L_q \hat{i}_q + u_d - k_d(i_d - \hat{i}_d)$ and
$L_q \dot{\hat{i}}_q = -\hat{R}(T_{cu})\hat{i}_q - p\Omega_m(L_d \hat{i}_d + \phi(T_{ai})) + u_q - k_p(i_q - \hat{i}_q)$; and iii) estimating magnetic flux intensity $\hat{\phi}$ of the at least one magnet from the measurements and of the currents $\hat{i}_d$ and $\hat{i}_q$ estimated by a state observer as follows:

$$\dot{\hat{\phi}}(T_{ai}) = k_\phi\left(p\Omega_m \frac{(i_q - \hat{i}_q)}{L_q}\right)$$

with: $L_d$ being the direct inductance of the electrical machine;

$L_q$ being the quadrature inductance of the electrical machine;

$k_d$, $k_r$, $k_p$, and $k_\phi$ being the calibration variables ; and p being the number of pole pairs of the electrical machine.

4. A method as claimed in claim 2, wherein the temperature $T_{cu}$ of the coils is determined by use of an equation as follows:
$R = R_0(1 + \alpha(T_{cu} - T_{ref}))$ with $R_0$ being a reference resistance of the at least one coil for reference temperature $T_{ref}$ and $\alpha$ being a constant temperature resistance parameter of the at least one coil.

5. A method as claimed in claim 2, wherein the temperature $T_{ai}$ of the magnet is determined by use of an equation as follows:
$\hat{\phi} = \phi_0(1 + \beta(T_{ai} - T_{ref}))$ with $\phi_0$ being a reference magnetic flux intensity of the at least one magnet for reference temperature $T_{ref}$ and $\beta$ being a constant temperature resistance parameter of the at least one magnet.

6. A method as claimed in claim 2, wherein the temperature $T_{ai}$ of the magnet is determined by use of an equation as follows:

$\hat{\phi}=\phi_0(1+\beta(T_{ai}-T_{ref}))$ with $\phi_0$ being a reference magnetic flux intensity of the at least one magnet for reference temperature $T_{ref}$ and $\beta$ being a constant temperature resistance parameter of the at least one magnet.

7. A method as claimed in claim 2, comprising preprocessing electrical quantities before estimating the resistance of the at least one coil and the magnetic flux intensity of the at least one magnet.

8. A method as claimed in claim 2, comprising preprocessing electrical quantities before estimating the resistance of the at least one coil and the magnetic flux intensity of the at least one magnet.

9. A method as claimed in claim 5, comprising preprocessing electrical quantities before estimating the resistance of the at least one coil and the magnetic flux intensity of the at least one magnet.

10. A method as claimed in claim 5, comprising preprocessing electrical quantities before estimating the resistance of the at least one one coil and the magnetic flux intensity of the at least one magnet.

11. A method as claimed in claim 1, wherein the magnetic flux intensity $\hat{\phi}$ of the at least one magnet is estimated by:

i) determining voltages $u_{d,q}$ and currents $i_{d,q}$ in Park's reference frame through transformation of the measured voltages $u_m$ and currents $i_m$, ii) estimating current $\hat{i}_d$ and current $\hat{i}_q$ with equations of the type as follows:
$L_d\dot{\hat{i}}_d=-\hat{R}(T_{cu})\hat{i}_d+p\Omega_m L_q\hat{i}_q+u_d-k_d(i_d-\hat{i}_d)$ and
$L_q\dot{\hat{i}}_q=-\hat{R}(T_{cu})\hat{i}_q-p\Omega_m(L_d i_d+\hat{\phi}(T_{ai}))+u_q-k_p(i_d-\hat{i}_d)$; and iii) estimating magnetic flux intensity $\hat{\phi}$ of the at least one magnet from the measurements and of the currents $\hat{i}_d$ and $\hat{i}_q$ estimated by a state observer as follows:

$$\dot{\hat{\phi}}(T_{ai}) = k_\phi\left(p\Omega_m\frac{\left(i_q-\hat{i}_q\right)}{L_q}\right)$$

with: $L_d$ being the direct inductance of the electrical machine;
$L_q$ being the quadrature inductance of the electrical machine;
$k_d$, $k_r$, $k_p$, and $k_\phi$ being the calibration variables; and
p being a number of pole pairs of the electrical machine.

12. A method as claimed in claim 11, wherein the temperature $T_{cu}$ of the coils is determined by use of an equation as follows:

$\hat{R}=R_0(1+\alpha(T_{cu}-T_{ref}))$ with $R_0$ being a reference resistance of the at least one coil for reference temperature $T_{ref}$ and $\alpha$ being a constant temperature resistance parameter of the at least one coil.

13. A method as claimed in claim 11, wherein the temperature $T_{ai}$ of the magnet is determined by use of an equation as follows:

$\hat{\phi}=\phi_0(1+\beta(T_{ai}-T_{ref}))$ with $\phi_0$ being a reference magnetic flux intensity of the at least one magnet for reference temperature $T_{ref}$ and $\beta$ being a constant temperature resistance parameter of the at least one magnet.

14. A method as claimed in claim 11, comprising preprocessing electrical quantities before estimating the resistance of the at least one coil and the magnetic flux intensity of the at least one magnet.

15. A method as claimed in claim 11, comprising preprocessing electrical quantities before estimating the resistance of the at least one one coil and the magnetic flux intensity of the at least one magnet.

16. A method as claimed in claim 1, wherein the temperature $T_{cu}$ of the coils is determined by use of an equation as follows:

$\hat{R}=R_0(1+\alpha(T_{cu}-T_{ref}))$ with $R_0$ being a reference resistance of the at least one coil for reference temperature $T_{ref}$ and $\alpha$ being a constant temperature resistance parameter of the at least one coil.

17. A method as claimed in claim 16, wherein the temperature $T_{ai}$ of the magnet is determined by use of an equation as follows:

$\hat{\phi}=\phi_0(1+\beta(T_{ai}-T_{ref}))$ with $\phi_0$ being a reference magnetic flux intensity of the at least one magnet for reference temperature $T_{ref}$ and $\beta$ being a constant temperature resistance parameter of the at least one magnet.

18. A method as claimed in claim 16, comprising preprocessing electrical quantities before estimating the resistance of the at least one coil and the magnetic flux intensity of the at least one magnet.

19. A method as claimed in claim 16, comprising preprocessing electrical quantities before estimating the resistance of the at least one coil and the magnetic flux intensity of the at least one magnet.

20. A method as claimed in claim 1, comprising preprocessing electrical quantities before estimating the resistance of the at least one coil and the magnetic flux intensity of the at least one magnet.

21. A method as claimed in claim 20, wherein the preprocessing of an electrical quantity y is carried out by decomposition of a measured electrical signal $y_m$ into a sum of cosinus and sinus functions depending on a measured position $\theta_m$ of the rotor with $$y_m = \sum_{i=1}^{N}(a_i\cos(i\theta_m) + b_i\sin(i\theta_m)),$$

wherein coefficients $a_i$, $b_i$ are determined by identification, then by conservation of the leading term: $y_f=a_1\cos(\theta_m)+b_1\sin(\theta_m)$.

22. A method as claimed in claim 21, comprising preprocessing electrical quantities before estimating the resistance of the at least one coil and the magnetic flux intensity of the at least one magnet.

23. A method as claimed in claim 1, wherein a temperature $T_{fer}$ is determined for a frame of the electrical machine by use of the temperatures $T_{cu}$ of the at least one coil and $T_{ai}$ of the at least one magnet and energy losses of the electrical machine.

24. A method as claimed in claim 23, wherein the temperature $T_{fer}$ of the frame is determined from a formula as follows:

$\dot{\hat{T}}=AT+KC(\hat{T}-T)+BP$ with $T=(T_{fer}, T_{cu}, T_{ai})$, $P=(P_{fer}, P_{joules}, P_m)$, $P_{fer}$ corresponding to iron losses of the electrical machine, $P_{joules}$ being joule losses of the electrical machine, $P_m$ being the mechanical losses of the electrical machine, K being a gain, with A being a constant matrix of a thermal model, $$B = \begin{bmatrix} 1 \\ 1 \\ 1 \end{bmatrix}$$

and $C = [0\ 1\ 1]$.

25. A synchronous electrical machine diagnostic method according to claim 1, for performing a diagnostic of the electrical machine comprising:
- determining internal temperatures of the electrical machine; and
- diagnosing if overheating of the synchronous machine occurs according to the determined temperatures.

26. A synchronous electrical machine control method, according to claim 1, comprising:
- determining internal temperatures of the electrical machine; and
- controlling torque of the synchronous machine according to the determined temperatures.

27. A method according to claim 26 for controlling a synchronous electrical machine control system.

28. A method according to claim 27 wherein the synchronous electrical machine control system controls a motor vehicle.

* * * * *